Jan. 13, 1959

W. B. JAMISON ET AL 2,868,526

MINING EQUIPMENT HAVING CUTTING ROTORS
ADAPTABLE TO VARYING CONDITIONS

Filed May 22, 1951

INVENTORS
W. B. Jamison
BY Boddie R. Derringe
ATTORNEYS

United States Patent Office 2,868,526
Patented Jan. 13, 1959

2,868,526

MINING EQUIPMENT HAVING CUTTING ROTORS ADAPTABLE TO VARYING CONDITIONS

Will B. Jamison and Bloddie L. Derringe, Greensburg, Pa., assignors to Bituminous Coal Research, Inc., Washington, D. C., a corporation of Delaware Application May 22, 1951, Serial No. 227,614

7 Claims. (Cl. 262—7)

This invention relates to mining equipment, especially of the mobile type, employing one or more cutting rotors, adapted to be advanced into a body of the material to be mined, which is particularly useful for the continuous mining of coal located in underground seams. The equipment preferably has conveyor mechanism associated therewith for conveying the mined material away from the region of the rotors and delivering it into cars which transport it out of the mine.

Equipment heretofore available, particularly for that type of mining operation, has lacked versatility or flexibility of operation or adaptation to varying conditions, for example changes of width, height and angle of seams to be mined, and has been ill adapted for tramming operations, notably in mines where much heavy timber or other shoring must closely follow up the mining equipment as it cuts adits, drifts, entries, slopes, etc. For instance, in prior machines known to us, the rotors have been useful only for one width and depth of cut, and they and other parts have had to be disassembled and/or removed in order to permit the machine to be withdrawn from a position into which it has made a cut, especially where supporting structure has been erected behind the machine.

The primary object of our invention is to overcome such disadvantages, preferably by the provision of a mining machine of the continuous cutting and loading type having great flexibility and versatility for cutting entries, or the like, of various dimensions both as to width and height, and at varying angles.

The invention further contemplates the provision of a mining machine in the form of a mobile unit in which the flexibility provides important tramming advantages.

Still further, the invention contemplates the accomplishment of one or more of the foregoing objects and advantages by the employment of adjustable, cutting rotors and especially rotors which may be adjusted, during operation, to cut kerfs of various diameters and/or adjusted for purposes of transport; and the provision of means for adjusting the spacing between rotor axes, for example from a minimum spacing in which the kerfs cut by the rotors overlap to a maximum spacing in which the kerfs are spaced apart; and in this regard the invention further involves means, notably a rotor transmission, for assuring synchronization of the arms of adjacent rotors when they operate in overlapping paths, for instance in one plane, to assure their intermeshing with clearance when they are adjusted to minimum spacing; while at the same time the invention contemplates an adjustable mounting of the rotors enabling a predetermined level of the entry to be maintained when changes are made in the diameter of the cut of the rotors, and further enabling the course of the entry to be changed upwardly or downwardly; and in conjunction with one or more of the foregoing purposes and advantages the invention contemplates the employment of co-operating cutter mechanism for cutting cross-kerfs between and tangent to the circular kerfs cut by the rotors, which mechanism in the preferred embodiment is adjusted to correspond to the adjustments of the cutting rotors, for example their adjustments of diameter or their center-to-center adjustment or both.

More specifically, the invention contemplates the provision of drive mechanism common to the cross-kerf cutting mechanism and to the cutting rotors, and further adapted to synchronize the rotors to prevent rotor interference when the rotors are adjusted to cut overlapping kerfs; the provision of braking and/or locking means for the rotors and their adjustment movements; and the provision of power actuated rack-and-pinion mechanism for effecting rotor diameter adjustments, rotor center-to-center adjustments, and cross-cutter mechanism adjustment.

Alternatively to, or in conjunction with, various of the foregoing features the invention contemplates the mounting of a pair of cutting rotors, adjustable both as to diameter and center spacing, to rotate in a common plane and in the mounting of a cutting rotor adjustable as to diameter intermediate of said pair to rotate in a plane in advance of the pair, and the conjoint operation and conjoint adjustment of a cutter chain or the like in co-operation with the foregoing.

The invention further contemplates novel mining rotors per se, features of construction, mounting, drive, adjustment and operation thereof, and of them and associated parts of the machine; as well as numerous other objects and advantages hereinafter disclosed, or which will be apparent to those skilled in the art, upon examination of this disclosure.

In the drawings the mining machine is illustrated in the form of a mobile unit mounted on a motor-driven tractor comprising endless treads (or the equivalent) of any well-known form diagrammatically indicated by the reference letter A.

The machine comprises in general a main frame or base B, cutting rotors C, a main rotor support D secured to the frame B, a main driving motor E for the rotors, cross-cutter mechanism F associated with the rotors, and a conveyor device G for conveying the mined material from the region of the rotors to a point rearwardly of the machine where it is loaded into cars for removal from the mine.

Figure 3:
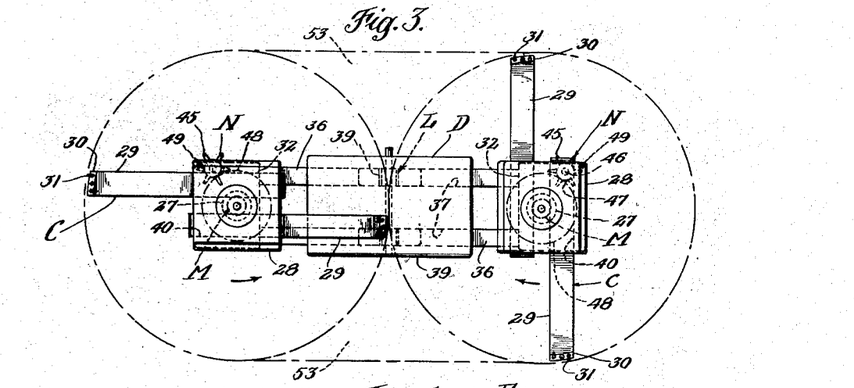
Figure 3 is a front view of the cutting rotors and their mounting, looking toward the left in Figure 1, showing diagrammatically the cutting chain associated with the rotors.

In Figures 1 to 7 inclusive we have illustrated a machine employing two cutting rotors rotating in opposite directions as indicated by the arrows in Figure 3. Drive is imparted to the rotors from the motor E by means of a first gear-reduction unit H of any well known form having two take-off shafts 25 connected by universally-jointed shafts 26, and splined connections, to two second suitable gear-reduction units K which in turn are drivingly connected to the shafts 27 of the cutting rotors C. The motor E and the gear-reduction unit H are mounted on the main frame or base B. The provision of a double reduction drive for the rotors provides for low-speed high-power drive of the rotors which is advantageous particularly in the mining of coal. In this regard we find that a rotor cutter speed of between 150 feet and 300 feet per minute is quite satisfactory, and causes less wear on the cutting tools than that which accompanies the usual very high speeds.

The drive to the rotors is adapted to synchronize the rotors so that the arms or blades of the rotors will intermesh with clearance when the rotors are adjusted, in a manner hereinafter appearing, on centers in which the kerfs cut by the rotors will overlap.

Each rotor comprises a hub member 28 secured on its rotor shaft 27, a pair of adjustable arms or blades 29, 29 carried by the hub member, tool holders 30 mounted on the blades and extending forwardly therefrom, and cutting tools 31 mounted in the tool holders.

The rotor shafts 27 are journalled in bearing supports or blocks 32 which are adjustably mounted in the main rotor support D, for movement toward and away from each other, by means of the sliding bars 36 hereinafter described more fully. The gear reduction units K are secured to the bearing blocks 32 by means of brackets 33.

Figures 13, 14, 15, 16, 17, 18, 19, 20:
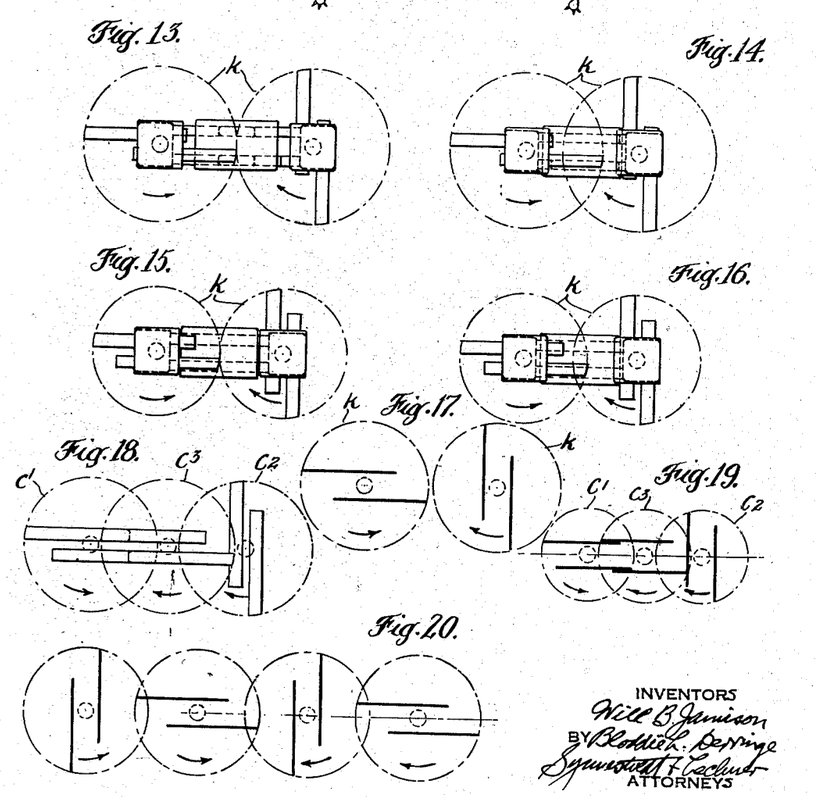
Figure 13 is a diagrammatic front view illustrating the diameter and relation of the kerfs cut by a pair of rotors when adjusted as shown in Figures 1, 2 and 3.
Figures 14 to 17 inclusive illustrate the diameter and relation of the kerfs cut by paired rotors in other adjustments thereof.
Figure 18 illustrates the diameter and relation of the kerfs cut by the rotors in the three-rotor arrangement of Figure 12.
Figure 19 illustrates the diameter and relation of the kerfs cut by the three rotors in another position of adjustment.
Figure 20 illustrates a four-rotor arrangement, with all rotors positioned to work in a common plane.

The adjustable mounting of the rotors provides for altering the center-to-center spacing of the rotors to enable the width of the opening, entry, tunnel, or the like, to be varied, as illustrated, for example, in Figures 13 to 17 inclusive. In Figures 13 and 15 the adjustment of the rotor centers is such that the kerfs cut by the rotors are tangent as indicated by the dot-and-dash circles k. In Figures 14 and 16 the adjustment is such that the kerfs overlap to provide an entry of less width than provided with the adjustments of Figures 13 and 15. In Figure 17 the adjustment is such that the kerfs k are laterally spaced apart to provide a wider entry.

The adjustment of the center-to-center spacing of the rotors, in the embodiment shown in Figures 1 to 7 inclusive, is provided by means of a rack-and-pinion mechanism L which is power-actuated as by means of a suitable controllable and reversible motor 34 having worm drive connection 35, 35' with the pinion of the mechanism L.

This worm 35 may be of an irreversible pitch so that any adjustment will be self-locking. The rotor bearing blocks 32 are each provided with a pair of inwardly extending arms 36 which have sliding fit in lateral bores 37 in the main rotor support D, it being noted that these bores are spaced apart as viewed in the plan views of Figures 2 and 6 so that the arms 36 of one bearing block are offset with respect to the arms 36 of the other.

Figures 6, 6A:
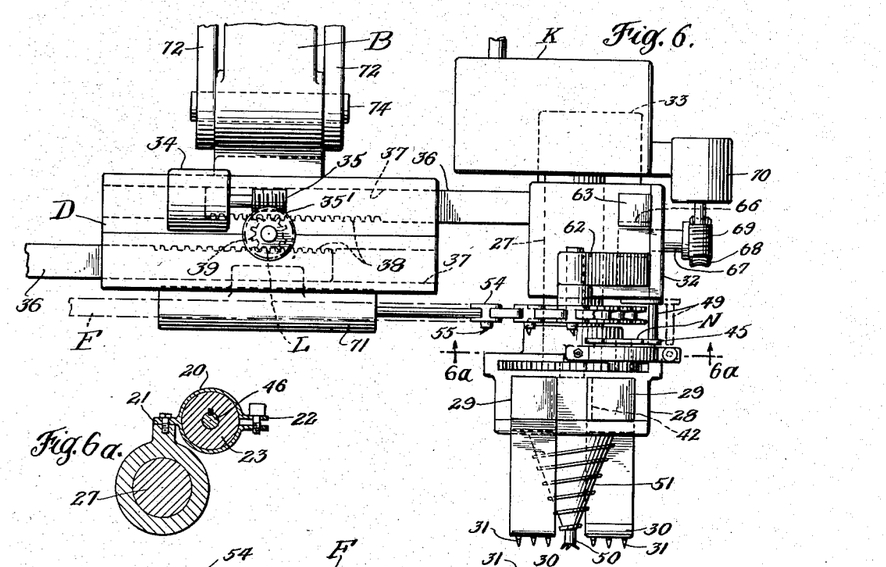
Figure 6 is a plan view of the mechanism shown in Figure 5.
Figure 6a is a detail sectional view on the line 6a—6a of Figure 6, showing an adjustable friction-type holding device acting upon rotor adjusting mechanism.

The adjacent faces of the arms 36 are provided with rack teeth 38 which mesh with the pinions 39 of the rack-and-pinion mechanism L. The lateral extent of the support D and the length of the arms 36 is such that when the rotors are adjusted to their maximum spacing there will still be a substantial overlap of the inner end portions of the bars (as seen in Fig. 6) so as to provide long bearing support of the rotor structure. Adjustment of the rotor centers away from each other is afforded by actuation of the motor 34 in one direction of rotation and toward each other by actuation of the motor in the other direction.

In addition to this adjustment of the rotor centers we have also provided for adjustment of the blades 29 to alter the diameter of the rotors and thus of the kerfs cut by the rotors. In the embodiment shown in Figures 1 to 7 inclusive this is accomplished by a rack-and-pinion mechanism M similar to that just described. In this instance, however, the rack-and-pinion mechanism of the rotor blades is power actuated as by means of a star wheel device N operating in a manner to be presently described.

Figure 5:
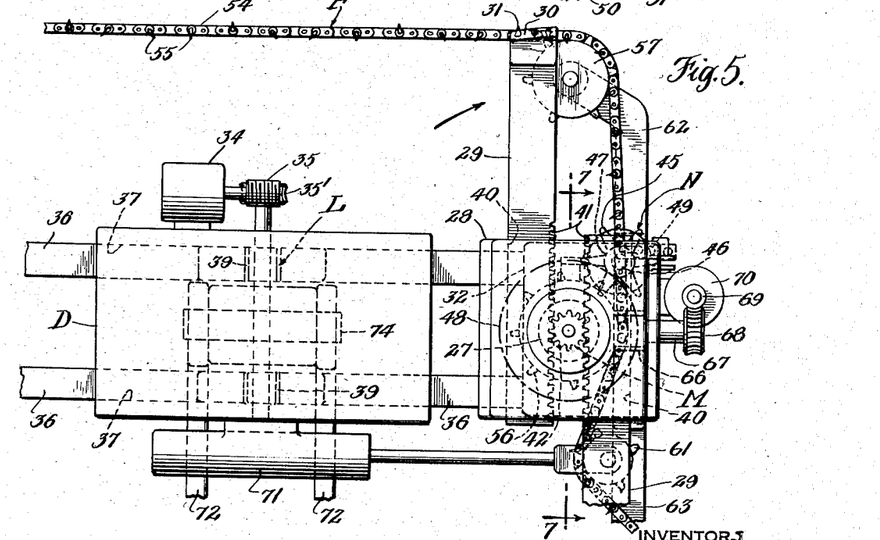
Figure 5 is an enlarged fragmentary view similar to the right-hand portion of Figure 3, but showing certain parts appearing in Figure 4 as well as parts which appear in Figure 3.

The rotor blades 29 have sliding fit in bores 40 in the hub members 28 and as viewed in Figures 3 and 5 these bores are spaced apart so that the blades are offset with respect to the hub center, i. e. one to each side of the center, which gives maximum adjustability of rotor with a given size of blade, and contributes toward simplicity of the adjustment mechanism (for example, rack-and-pinion system). The blades are provided with rack teeth 41 on their adjacent faces which mesh with the pinion 42 of the mechanism M. The pinion is mounted coaxially with the rotor shaft 27 by means of a shaft 43 having bearings 44 in the hub member 28, as clearly shown in Figure 7.

Rotation of the pinion of Figure 5 in a clockwise direction moves the rotor blades outwardly to increase the diameter of the kerf cut by the rotors, and rotation in a counter-clockwise direction moves the blades inwardly to decrease the diameter.

The star wheel device N for accomplishing the adjustment comprises a star wheel 45 rotatably mounted in the hub member 28 by means of a shaft 46 on which a pinion 47 is keyed. This pinion meshes with a gear 48, which in turn is keyed on the rack pinion shaft 43.

As the rotor rotates, a spoke of the star wheel 45 engages a pin 49 adjustably carried by the bearing block 32, and the star wheel is caused to rotate, through an angle equal to that between adjacent spokes, in a direction opposite to the direction of rotation of the rotor. This rotates the gear 48 and rack pinion 42, in the direction of rotation of the rotor, to effect adjustment of the blades. Assuming now that the right-hand rotor of Figure 3 is rotating in a clockwise direction, then the star wheel will be rotated in a counter-clockwise direction and the rack pinion 42 in a clockwise direction. This will cause adjustment of the blades outwardly to increase the diameter of cut. Similarly, rotation of the left-hand rotor in the counter-clockwise direction of Figure 3 causes rotation of the star wheel in a clockwise direction and the rack pinion 42 in a counter-clockwise direction to also adjust the blades of this rotor outwardly to increase the diameter of cut.

When adjustment has been made to the desired diameter the adjustable pin 49 is moved out of the path of the star wheel, as indicated in dot-and-dash lines in Figures 5 and 6, and the rotor then continues to rotate with the blades in the adjusted position. Adjustment to smaller diameters is effected by reversing the direction of rotation of the rotors. The adjustment of pin 49 between effective and ineffective positions may be made by a simple slidable support, as indicated.

Referring particularly to Figure 5, it may be pointed out that when the arms 29 have been adjusted outwardly to the extent shown, the pin 49 is moved out of the path of the star wheel, and no further outward adjustment thereafter occurs. By thus terminating the outward adjustment, the inner end portions of the arms 29 remain in substantial overlapped relation to provide extended bearing thereof in the hub member under conditions of maximum adjustment. The rack teeth are extended to the inner ends of the arms or blades to facilitate assembly of the blades in the hub member and at the same time act as a safeguard in the event of overrun of outward adjustment.

It will be seen from the foregoing that we have provided means for adjusting the diameter of the rotors from a smaller diameter gradually to a larger diameter while the rotors are in cutting action, and this is of great importance in cutting entries in mines where increase in the thickness of the stratum being mined may call for an increase in the cut. Just by way of example, this adjustment might be from a cut of six feet in diameter to a cut of eight feet in diameter. In the absence of such means for gradually increasing the diameter of the rotors it would be necessary to first back the machine away from the face of the entry to enable enlarging of the entry, for example by hand-picking, and then to move the machine into the enlarged portion to make the adjustment to the larger diameter. Such procedure would be very costly and time-consuming. Through the practice of our invention the machine continues in its mining operation without substantial interruption while the increase in diameter is being effected.

Similarly, in widening the tunnel we are enabled by control of the motor 34 to gradually increase the width of the entry without interruption of the mining operation.

To assure the holding of any desired adjustment of the rotor diameter, the rotors may be provided with braking or locking devices. An example is the friction device 20 (Fig. 6a) anchored at 21, and adjustable at 22, adapted to frictionally grip the drum 23 mounted to turn with the star wheel 45. Alternatively, other means may be used for this purpose, for example an irreversible screw or worm element in the system of operating elements for the star wheel (similar to the irreversible worm 35 in the operating mechanism for the center-to-center adjustment of the rotors).

Figure 1:
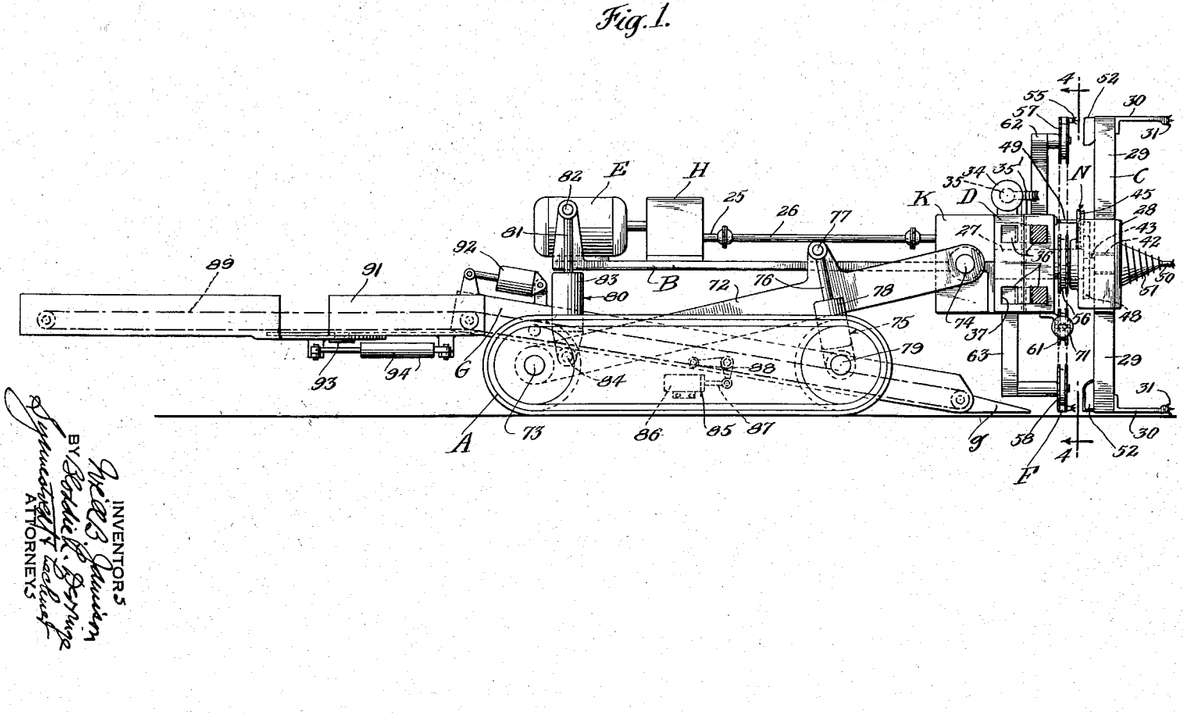
Figure 1 is a sectional side elevational view of a two-rotor machine embodying our invention, taken on the line 1—1 of Figure 2.
Figure 2:
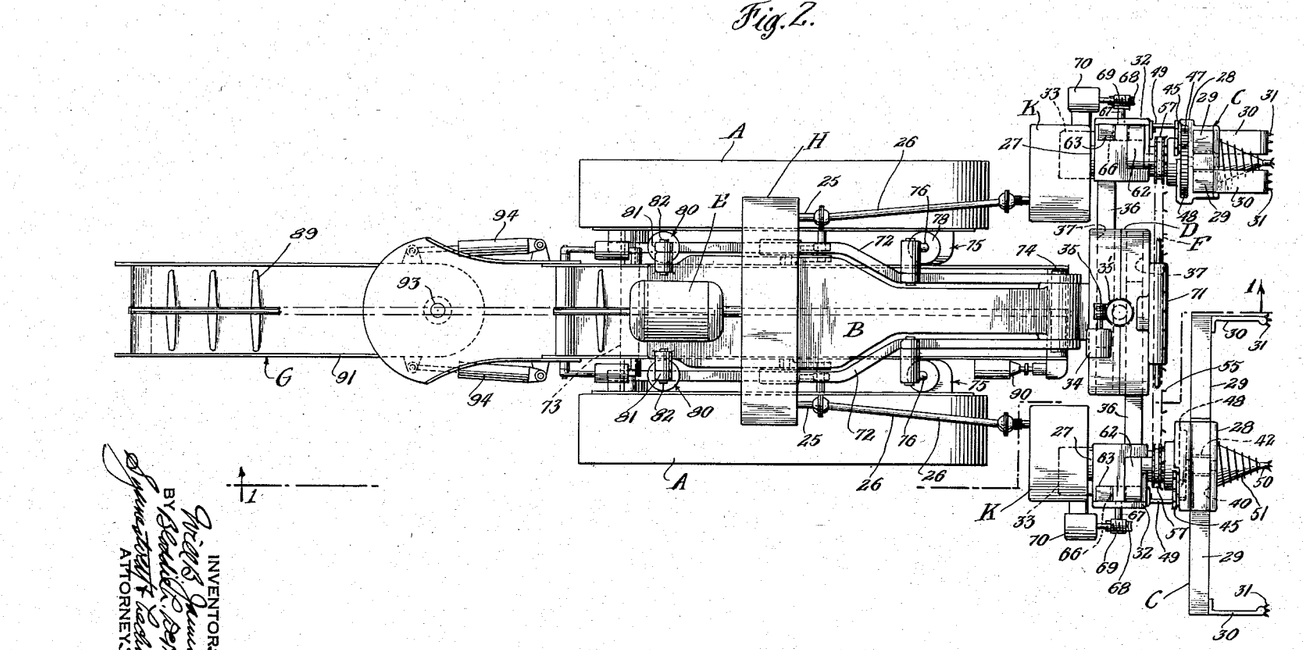
Figure 2 is a plan view of the machine.

The rotors are provided with central boring bits 50 and cones 51 to aid in promoting advancement of the rotors into the vein or stratum, and/or to break out the material as it is cut. Suitable scoops or shovels 52 indicated in Figure 1 are provided on the rotors for directing the coal to the conveyor G. By a proper shape and disposition of these scoops, coupled with the proper sense of rotation of the rotors, i. e. toward each other at the bottom, the entry is kept clear of cut material and the material tends to be forced back centrally onto the conveyor G, as later herein referred to.

Referring to Figure 3 it will be noted that substantially triangular tusks 53 of coal remain between the circular openings cut by the rotors, and, in order to remove these tusks, cross-cutter mechanism F is provided in back of the rotors, illustrated in the form of a cutter-chain of known construction comprising links 54 carrying side cutting tools 55 for cutting cross kerfs to remove the tusks.

In view of the adjustable nature of the rotors in a machine constructed in accordance with the invention, we have made provision for adjusting the cutter chain in accordance with the rotor adjustments of the machine, and to the accomplishment of this end we have provided novel adjusting mechanism for the chain.

Figure 4:
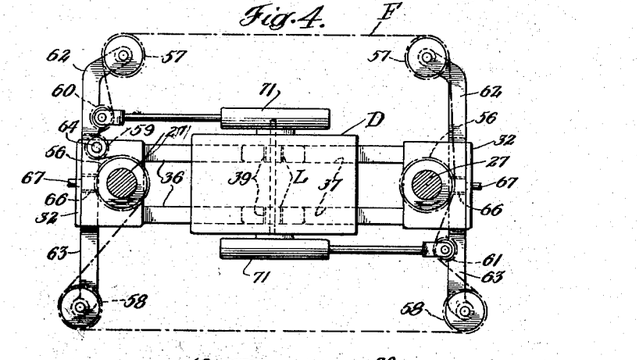
Figure 4 is a cross-section taken on the line 4—4 of Figure 1.

This mechanism comprises drive sprockets 56 for the chain, keyed on the rotor shafts 27, upper guide sprockets 57, lower guide sprockets 58, an intermediate guide sprocket 59, and chain take-up sprockets 60 and 61. These sprockets are located in a transverse plane adjacent the plane of rotation of the rotors C. The chain passes over the sprockets as shown in Figure 4 in such manner that drive is imparted thereto from both rotors C.

The upper guide sprockets 57 are carried by upwardly extending arms 62 adjustably mounted in the bearing blocks 32 and the lower guide sprockets 58 are carried by downwardly extending arms 63 also adjustably mounted in the bearing blocks 32. The guide sprocket 59 is mounted on a shaft 64 secured in the bearing block 32 of the left-hand rotor.

Figure 7:
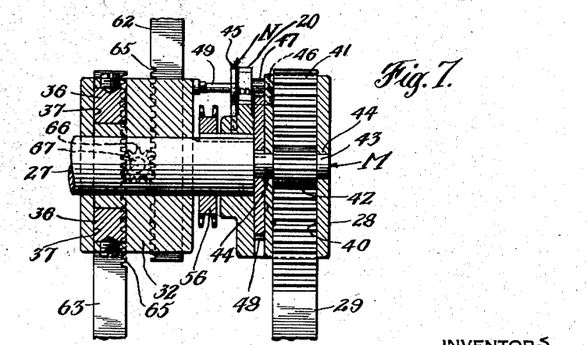
Figure 7 is a section taken on the line 7—7 of Figure 5.

As best seen in Figure 7, the arms 62 and 63 are mounted in the bearing blocks 32 in offset relation and are provided with rack teeth 65 on their adjacent faces adapted to mesh with a pinion 66. The pinions 66 are mounted on shafts 67 having bearing in the blocks 32. The shafts 67 have worm wheels 68 (Figs. 5 and 6) secured thereto at their outer ends meshing with the worms 69 on the shafts of the controllable and reversible motors 70. These motors drive the pinions to adjust the sprockets 57 and 58 in and out in accordance with the direction of rotation of the motors. The worms 69 are preferably of the self-locking type, to hold any given adjustment, as hereinbefore described with reference ot the worm-and-wheel system 35, 35', for the rotor center adjustment.

When the rotor arms 29 are adjusted either inwardly or outwardly to change the diameter of cut, the motors 70 are actuated by any suitable known form of control mechanism to correspondingly move the guide sprockets 57 and 58, so that the kerf cut by the chains will be in proper relation to the adjusted diameter of the rotors.

It is to be observed that since the arms 62 and 63 are mounted in the bearing blocks 32 of the rotors C, the guide sprockets 57 and 58 will move inwardly and outwardly with the rotors when adjustment of rotor centers is made, thus maintaining these sprockets in proper relation to the rotors.

In order to keep the chain tight when adjustments of the chain are made, we provide chain take-up or tightener sprockets 60 and 61 adapted to take up or let out chain, as the case may be. These sprockets are controlled as by means of hydraulic cylinder and piston devices 71 mounted on the main support D.

Reverting now to the mounting of the apparatus on the treads A, it will be seen that the main frame or base B is adjustably mounted on the treads as by means of a pair of spaced arms 72 pivotally mounted on the treads at the rear portion thereof. In this instance the arms are pivoted on the tread driving axle 73 and incline upwardly and forwardly therefrom. The forward ends of the arms are connected to the base B by means of a cross-pin 74. These arms are adapted to be swung up and down to raise and lower the base B as by means of a hydraulic cylinder and piston device 75, the piston rods 76 of which are pivotally connected to the arms at 77 and the cylinders 78 of which are pivotally connected to framing of the tractor at the location of axle 79.

The frame or base B is adjustably connected to the arms 72 adjacent their pivots as by means of hydraulic cylinder and piston devices 80, the piston rods 81 of which are pivotally connected to the frame B at 82 and the cylinders 83 of which are pivotally connected to the arms at 84.

In Figure 1 the frame B is shown adjusted in parallelism with the treads so that the plane of rotation of the rotors is normal to the plane of tread of the treads and in this adjustment a level entry will be bored. If it is desired to bore upwardly or downwardly the hydraulic devices 75 and 80 are actuated to incline the frame up or down, as the case may be, with the result that the rotors are inclined to change the bottom level of the bore. For example, if the pistons of the hydraulic devices 75 are held against movement and the pistons of the hydraulic devices 80 moved downwardly the rotors will tilt rearwardly at the top and forwardly at the bottom, with the result that the bottom of the entry will be cut at a higher level. When the tractor tread reaches this higher level it inclines upwardly and the cut is again higher, and so on. Thus the entry moves up into the stratum in steps, so to speak, and when the desired height and/or angle is reached the hydraulic devices are actuated to set or restore the desired condition, for example to level the machine to the position shown in Figure 1.

Another purpose of this adjustability of the frame has to do with adjustment of the rotors to different diameters. Assuming now that the rotors have been adjusted to the diameter illustrated in Figure 1 and that the machine frame and treads are in parallelism to cut a level bore, and it is desired to continue on with an entry of less height with the bottom of the entry remaining level. It will be observed that when the diameter of the rotors is decreased the lower periphery of the rotors will tend to be raised above the desired level of the bottom of the entry. In order to bring or keep the rotors down to the desired level, the base is swung down by actuation of the hydraulic devices 78 and is kept to the desired level and/or angle by actuation of the hydraulic devices 80.

It is also pointed out that as the entries are bored, suitable shoring must be erected to prevent the possibility of cave-ins and this shoring must be cleared by the machine in backing it out of the entry. Through the provision of adjustable rotors mounted on adjustable centers we are enabled to decrease the overall height and width of the machine to the point of providing ample tramming clearance. Also, for purposes of tramming, we have provided means for raising the receiving end g of the conveyor G above the bottom of the entry comprising a hydraulic piston and cylinder device 85, the cylinder 86 of which is secured to framing of the tractor unit and the piston rod 87 of which is connected to the conveyor through the medium of a bell crank 88.

The conveyor G is of a standard construction used in mining machinery and comprises in general a conveyor chain 89 driven by a motor device 90 (Fig. 2) and associated trough structure including a rear section 91 adapted to be raised and lowered to different positions of inclination by a hydraulic cylinder and piston device 92 and adapted to be swung laterally on a pivot 93 as by means of piston and cylinder devices 94.

Figure 8:
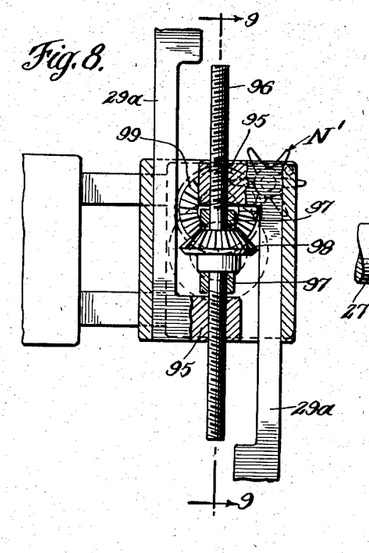
Figure 8 is a fragmentary view, showing (mainly in section) a modified form of rotor and chain adjusting mechanism which may be employed in place of the form shown at the right of Figure 5, the view being taken on the line 8—8 of Figure 9.
Figure 9:
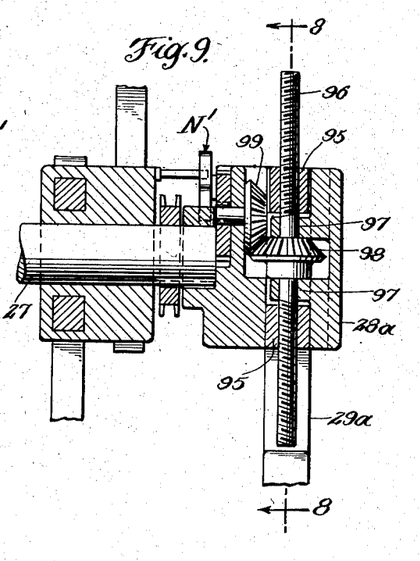
Figure 9 is a sectional view taken on the line 9—9 of Figure 8, having a relation thereto similar to the relation of Figure 7 to Figure 5.

Turning now to Figures 8 and 9, it will be seen that we have shown a modified form of mechanism for adjusting the rotor blades. In this form, the blades 29a, are provided with ears 95 having threaded apertures for the reception of an adjusting screw 96. The screw 96 is provided with right- and left-hand threads engaging the ears 95 so that when it is rotated in one direction the blades are moved inwardly to decrease the diameter of the cut of the rotor, and when rotated in the opposite direction the blades are moved outwardly to increase the diameter of the cut of the rotor. The screw is held against longitudinal displacement by means of spaced ears 97 provided in the rotor hub 28a which engage the bevel gear 98 keyed on the screw 96. A star wheel device N' similar to that above described is provided to rotate the screw 96 to effect adjustment of the blades. A bevel gear 99 meshing with the bevel gear 98 drivingly connects the star wheel device to the adjusting screw 96. The screw 96 may be of irreversible (i. e., self-locking) pitch, for maintenance of adjustment. In this case, no friction device (such as in Fig. 6a) is needed.

Figure 10:
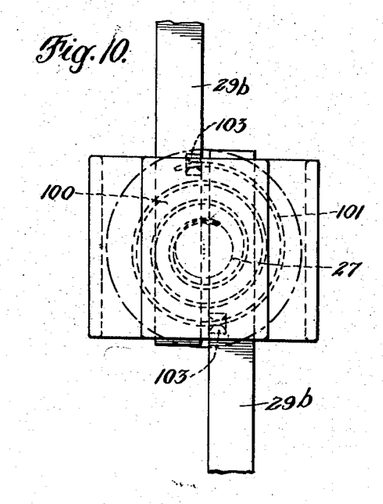
Figure 10 is a fragmentary face view showing a third form of adjusting mechanism according to the invention, this view being in elevation as is Figure 5 instead of in section as is Figure 8.
Figure 11:
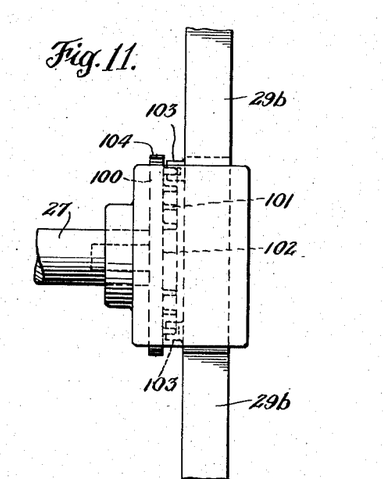
Figure 11 is a fragmentary side view of Figure 10.

In Figures 10 and 11 another modified form of rotor blade adjusting mechanism is illustrated, comprising a rotatable disc 100 mounted coaxially with the rotor shaft 27 and having a spiral track 101 at its side face 102 with which shoes 103 carried by the rotor blades 29b engage. Referring to Figure 10, it will be seen that when the disc 100 is rotated in a counter-clockwise direction the blades will move inwardly to decrease the diameter of cut of the rotor, and, when rotated in a clockwise direction, the blades will move outwardly to increase the diameter of cut.

Suitable drive means may be provided for rotating the disc 100, as, for example, a star wheel device such as described above having a driven gear meshing with the teeth 104 provided on the periphery of the disc 100.

Figure 12:
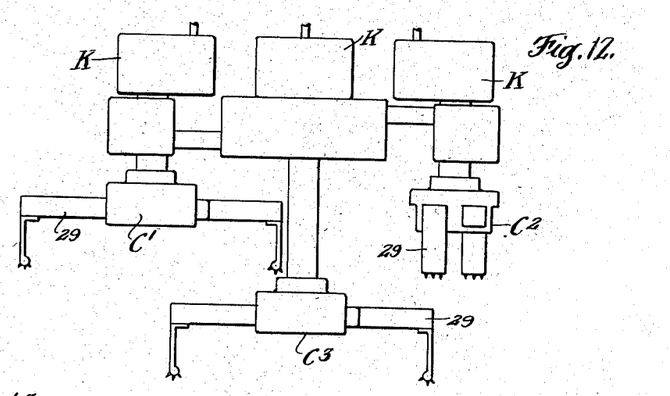
Figure 12 is a more or less diagrammatic plan view of a three-rotor arrangement.

In Figure 12 a form of the machine is shown in which three rotors $C^1$, $C^2$ and $C^3$ are employed. The rotors $C^1$ and $C^2$ are positioned to rotate in the same plane and the rotor $C^3$ to rotate in a plane in front of the plane of the rotors $C^1$ and $C^2$. The construction, mounting, and center-adjustment of the rotors $C^1$ and $C^2$ is in accordance with the disclosure in connection with the first form described, as is also the construction and adjustment of the blades 29 of the rotors. The central rotor $C^3$ however is mounted on a fixed center. Gear reduction units K are provided for the rotors. We also contemplate employing three or more rotors positioned to rotate in the same plane, as will appear hereinafter, with reference to Figure 20.

Figures 13 and 14 diagrammatically illustrate a two-rotor arrangement, in which the blades are adjusted to provide a cut of maximum diameter, but with two different center adjustments of the rotors. Figures 15 and 16 show these rotors adjusted to a smaller diameter, again with two different center adjustments. Figure 17 shows these rotors on such widely spaced centers that a gap is left between the kerfs.

Figure 18 is a diagrammatic face view of the three-rotor arrangement of Figure 12 and illustrates how the cuts of the rotors overlap with the center adjustment of Figure 12. The rotors $C^1$ and $C^2$ may be adjusted outwardly to provide a tangent condition such as illustrated in Figure 15, or to provide a spaced condition such as illustrated in Figure 17. Figure 19 is similar to Figure 18 but shows adjustment to a smaller diameter of cut and adjustment of the outer rotors on closer centers.

Figure 20 illustrates a four-rotor arrangement with the rotors rotating in the direction of the arrows. These rotors are preferably positioned to rotate in the same plane, although in some instances it may be desirable to position one or more of the rotors to rotate in a plane in advance of the remaining rotors. In the assembly as shown, the blades or arms of the rotors are positioned to intermesh, and their synchronization may be assured by driving them from a common transmission (as in the case of the two-rotor embodiment first described). In this arrangement, while all rotors should be adjustable as to effective diameter, the two intermediate rotors may be located on fixed centers, the two outermost rotors being adjustable laterally. It will be observed that, just as in the case of the first embodiment, the rotors rotate toward the center of the machine, at the bottom, so as to facilitate clearing of the cut material and to cooperate best with the conveyor system.

Reverting to the adjustment devices shown in Figures 8 and 11, while these modifications have only been shown in association with the rotor blades, it is to be understood that adjusting devices of this character may also be employed for adjusting the rotor centers and the cutter-chain mechanism. It might also be noted that controllably reversible motor devices, such as described for actuating the center-to-center adjusting mechanism of the rotors, may be applied to the machine for actuating the adjusting mechanisms of the rotor blades in order to provide a continuously progressive adjustment thereof instead of the step-by-step adjustment afforded by the star wheel devices described.

Although we have illustrated each rotor as having two blades, it is to be understood that the advantages of the invention can, at least to some extent, be realized when employing rotors having more or less than two blades, although where rotors are to have their blade paths overlap in one plane, the number of blades per rotor may be limited by clearance requirements and the desired ranges of the adjustments. Also, the rotors can be provided with a plurality of spaced tool holders (at different radii) instead of tool holders located only at the blade peripheries.

A particular advantage of the two-blade rotor is that it makes feasible a close parallel disposition of the blades, symmetrically relative to the rotor axis and the adjusting mechanism, and provides for a maximum effective range of adjustment for a blade of given length, while at the same time affording a substantial bearing or support for the blades when they are fully extended.

From the foregoing description of typical embodiments and operations of the invention, it is believed clear that our improved rotors, equipment employing the same, and our mining machine as a whole provide great advantages in the way of adaptability to widely varying requirements and conditions of use. While the invention makes use of certain standard or well-known elements, for example: known traction means (such as an endless tread device), known conveyor means, ordinary transmissions and controllable motors, and cutting tools of known and readily available types, it embodies on the other hand new rotor features, new mountings for the rotors, new modes of adjustment and new mechanisms for making those adjustments; and finally, it combines with such new features a number of new and very advantageous cooperative arrangements between the old and the new. For example, adjustments between the frame, the tractor means and the conveyor; the combination of adjustments between them and the cutting equipment taken as a whole; the coordinated adjustments of the rotors and the cutting chain; and various other features, involve novel combinations of very substantial advantage, as will be apparent to those skilled in this art.

We claim:

1. In a mining machine, a plurality of cutting rotors adapted to cut circular kerfs in a body of material to be mined, bearing blocks rotatably carrying said rotors, a support in which said blocks are movably mounted to alter the center-to-center spacing of the rotors, means for effecting such movement of said blocks, cutting mechanism adapted to cut cross-kerfs substantially tangent to the circular kerfs cut by the rotors, and means for supporting said cutting mechanism from said bearing blocks.

2. In mining equipment, a rotor drive shaft, a hub mounted on said shaft and adapted to be rotated thereby, the hub having two slots disposed on opposite sides of the axis of the shaft, a rotor arm slidably mounted in each slot, each arm being provided with a rack, a pinion mounted on said shaft and cooperating with said racks, a starwheel rotatably mounted on said hub in driving engagement with said shaft, and a pin selectively engageable with said starwheel to cause rotation thereof and fixedly mounted with respect to said rotatable hub.

3. A construction in accordance with claim 2 further including a selectively operable brake to prevent rotation of the starwheel.

4. In mining equipment, two rotor drive shafts arranged generally parallel to one another, a hub mounted on each shaft, each hub carrying a cutting rotor, a mechanism associated with each hub for progressively increasing the respective rotor diameters, a bearing block for each said shaft, each block carrying a pair of arms slidable oppositely to one another, a sprocket rotatably mounted on each arm, an endless cutting chain mounted on the sprockets, mechanism to progressively slide the respective arms away from one another when the respective rotor diameters are increased, and means to let out said chain to accommodate the movement of said arms.

5. In mining equipment, a frame, two rotor hubs connected with said frame, each hub carrying a pair of cutters arranged to rotate in a circular path, the respective paths lying substantially in the same plane, mechanism associated with each hub to vary the diameter of the respective circular paths, mechanism to adjustably position the frame in a vertical direction and to adjustably tilt the frame in any of the positions of vertical adjustment, whereby to raise and lower said cutters and to tilt the plane of said paths, traction means having two spaced-apart axles, said vertically adjusting and tilting mechanism comprising a yoke pivotally connected between one axle and one end of said frame, hydraulic mechanism pivotally connected between the yoke and the other said axle, and second hydraulic mechanism pivotally connected between the other end of said frame and said yoke.

6. In mining equipment, a main rotor support, the support being provided with a pair of transversely extending slots, an arm slidably mounted in each said slot, a rotor drive shaft carried by each said arm, a rack on each said arm, a gear in driving engagement with said racks and a reversible motor to drive said gear, whereby to adjustably slide the arms in the slots to simultaneously move said shafts toward or away from one another.

7. In a mining machine, at least a pair of cutting rotors arranged on generally parallel axes and adapted for advancement axially into a body of material to be mined, a frame common to both said rotors, mechanism for adjusting said rotors to alter the diameter of circular kerfs cut thereby, means mounting said rotors on said common frame including mechanism for adjusting both axes of said pair to vary the spacing therebetween, a cutting mechanism mounted on said frame adapted to cut cross-kerfs at the top and bottom of the entry substantially tangent to the circular kerfs cut by said rotors, means for adjusting said cutting mechanism relative to said frame to accommodate the adjustments of the rotor diameters, and said cutting mechanism further having means for adjusting it to accommodate variation of spacing between rotor axes, the latter means being actuated by the mechanism which adjusts the spacing between rotor axes.

References Cited in the file of this patent

UNITED STATES PATENTS

| | | |
|---|---|---|
| 171,354 | Cooley | Dec. 21, 1875 |
| 504,179 | Stanley | Aug. 29, 1893 |
| 1,333,491 | Hughes | Mar. 9, 1920 |
| 1,335,723 | Campell | Apr. 6, 1920 |
| 1,445,085 | Joy | Feb. 13, 1923 |
| 1,603,621 | McKinlay | Oct. 19, 1926 |
| 1,726,963 | McKinlay | Sept. 3, 1929 |
| 1,871,638 | Vodoz | Aug. 16, 1932 |
| 1,953,402 | Graham | Apr. 3, 1934 |
| 1,993,948 | Schroeder | Mar. 12, 1935 |
| 2,105,504 | Ramsay | Jan. 18, 1938 |
| 2,105,505 | Ramsay | Jan. 18, 1938 |
| 2,261,162 | Joy | Nov. 4, 1941 |
| 2,269,781 | Osgood | Jan. 13, 1942 |
| 2,327,928 | Osgood | Aug. 24, 1943 |
| 2,606,010 | Howard | Aug. 5, 1952 |
| 2,694,562 | Snyder et al. | Nov. 16, 1954 |
| 2,694,563 | Graham | Nov. 16, 1954 |

FOREIGN PATENTS

| | | |
|---|---|---|
| 443,615 | Germany | May 3, 1927 |
| 570,671 | Germany | Feb. 23, 1933 |
| 290,349 | Great Britain | May 10, 1928 |
| 631,099 | Great Britain | Oct. 27, 1949 |

OTHER REFERENCES

"Coal Age," May 13, 1926, pages 667–670.
Colmol article in "Coal Mining" magazine, February 1949, pp. 15, 16, 17 and 18.